(12) United States Patent
Maiman et al.

(10) Patent No.: US 12,192,403 B2
(45) Date of Patent: Jan. 7, 2025

(54) COMPUTER-BASED SYSTEMS HAVING COMPUTING DEVICES PROGRAMMED FOR CALLER IDENTITY VERIFICATION AND METHODS OF USE THEREOF

(71) Applicant: Capital One Services, LLC, McLean, VA (US)

(72) Inventors: Tyler Maiman, Melville, NY (US); Lin Ni Lisa Cheng, Great Neck, NY (US); Dwij Trivedi, Oakton, VA (US); Asher Smith-Rose, Midlothian, VA (US); Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 228 days.

(21) Appl. No.: 18/057,352

(22) Filed: Nov. 21, 2022

(65) Prior Publication Data

US 2024/0171674 A1 May 23, 2024

(51) Int. Cl.
*H04M 1/56* (2006.01)
*H04M 3/42* (2006.01)
*H04M 15/06* (2006.01)

(52) U.S. Cl.
CPC .............................. *H04M 3/42059* (2013.01)

(58) Field of Classification Search
CPC ................................................ H04M 3/42059
See application file for complete search history.

(56) References Cited

U.S. PATENT DOCUMENTS

| D719,585 S | 12/2014 | Chaudhri |
| D766,268 S | 9/2016 | Katz |
| D775,190 S | 12/2016 | Caldwell |
| D782,518 S | 3/2017 | Walters et al. |
| 10,681,206 B1 * | 6/2020 | Kreiner ............... H04M 7/0078 |
| 10,958,784 B1 * | 3/2021 | Way ....................... G06N 20/00 |
| 2003/0174823 A1 * | 9/2003 | Justice ................ G06Q 20/4016 379/145 |
| 2018/0176372 A1 * | 6/2018 | Algard .............. H04M 3/42042 |
| 2023/0262160 A1 * | 8/2023 | Trivedi ............. H04M 3/42102 704/251 |
| 2024/0121338 A1 * | 4/2024 | Charlson ........... H04M 3/42042 |

FOREIGN PATENT DOCUMENTS

WO 218602 S 10/2021

* cited by examiner

*Primary Examiner* — Simon King
(74) *Attorney, Agent, or Firm* — Greenberg Traurig, LLP

(57) ABSTRACT

Systems and methods of caller identity verification and notification are disclosed. In one embodiment, an exemplary computer-implemented method may include: configuring a notification application, executing at a first computing device associated with a first user, the first user associated with an entity; receiving, from the notification application executing on the first computing device, an indication when the first user initiates a particular call to a second user; determining an application associated with the entity and installed on the second computing device of the second user, the application having an icon displayed at a screen of the second computing device; and instructing the application, executing on the second computing device, when the second computing device has received the particular call from the first user, to update an appearance of the icon associated with the application to display an indicator with regard to that the first user is associated with the entity.

20 Claims, 10 Drawing Sheets

COMPUTER-BASED SYSTEMS HAVING COMPUTING DEVICES PROGRAMMED FOR CALLER IDENTITY VERIFICATION AND METHODS OF USE THEREOF

FIELD OF TECHNOLOGY

The present disclosure generally relates to improved computer-implemented methods, improved computer-based platforms or systems, improved computing components and devices configured for one or more practical technological improvement applications to verify communication source identity information, including, but not limited to, caller identity information against fraudulent activities.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management. For example, without limitation, one fraudulent attack may spoof a legitimate entity's identity to engage vishing-typed attacks after sensitive or private information that a user might be willing to share with the legitimate entity. For another example, telemarketing or spam calls with forged caller identities likewise lead to security risks for various users as well as legitimate entities impersonated in those calls. When it is difficult to detect such vishing or spam calls based on the caller line identification (caller ID) information, sensitive and/or private information may be breached or compromised via the receipt of such communications.

SUMMARY OF DESCRIBED SUBJECT MATTER

In some embodiments, the present disclosure provides various exemplary technically improved computer-implemented methods involving caller identity verification/notification, the method including steps such as: configuring, by one or more processors, a notification application, executing at a first computing device associated with a first user, such that to transmit an indication upon the first user initiating a call to another user, the first user associated with an entity; receiving, by the one or more processors, from the notification application executing on the first computing device, a particular indication when the first user initiates a particular call to a second user; receiving, by the one or more processors, from a second computing device of the second user, a permission indicator identifying a permission by the second user to detect calls being received by the second computing device; receiving, by the one or more processors, from the second computing device, a second indication of the particular call being received from the first user; determining, by the one or more processors, an application associated with the entity and installed on the second computing device of the second user, the application having an icon displayed at a screen of the second computing device; and instructing, by the one or more processors, the application, executing on the second computing device, when the second computing device has received the particular call from the first user, to update an appearance of the icon associated with the application to display an indicator with regard to that the first user is associated with the entity.

In some embodiments, the present disclosure further provides various exemplary technically improved computer-implemented methods involving caller identity verification/notification, the method including steps such as: obtaining, by one or more processors, a trained call verification machine learning model that determines a likelihood of when a phone number is associated with a fraudulent entity or a legitimate entity; receiving, by the one or more processors, from a computing device of a first user, a permission indicator identifying a permission by the first user to detect calls being received by the computing device; receiving, by the one or more processors, from the computing device, an indication of a particular call being received from a second user at a particular phone number, the second user claiming to be associated with a particular entity; identifying, by the one or more processors, an application installed on the computing device, the application associated with the particular entity and having an icon displayed at a screen of the computing device; utilizing, by the one or more processors, the trained call verification machine learning model to determine a likelihood that the particular phone number is associated with the particular entity; and instructing, by the one or more processors, the computing device to update an appearance of the icon associated with the application to display an indicator to reflect the likelihood that the particular phone number is associated with the particular entity.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, where like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
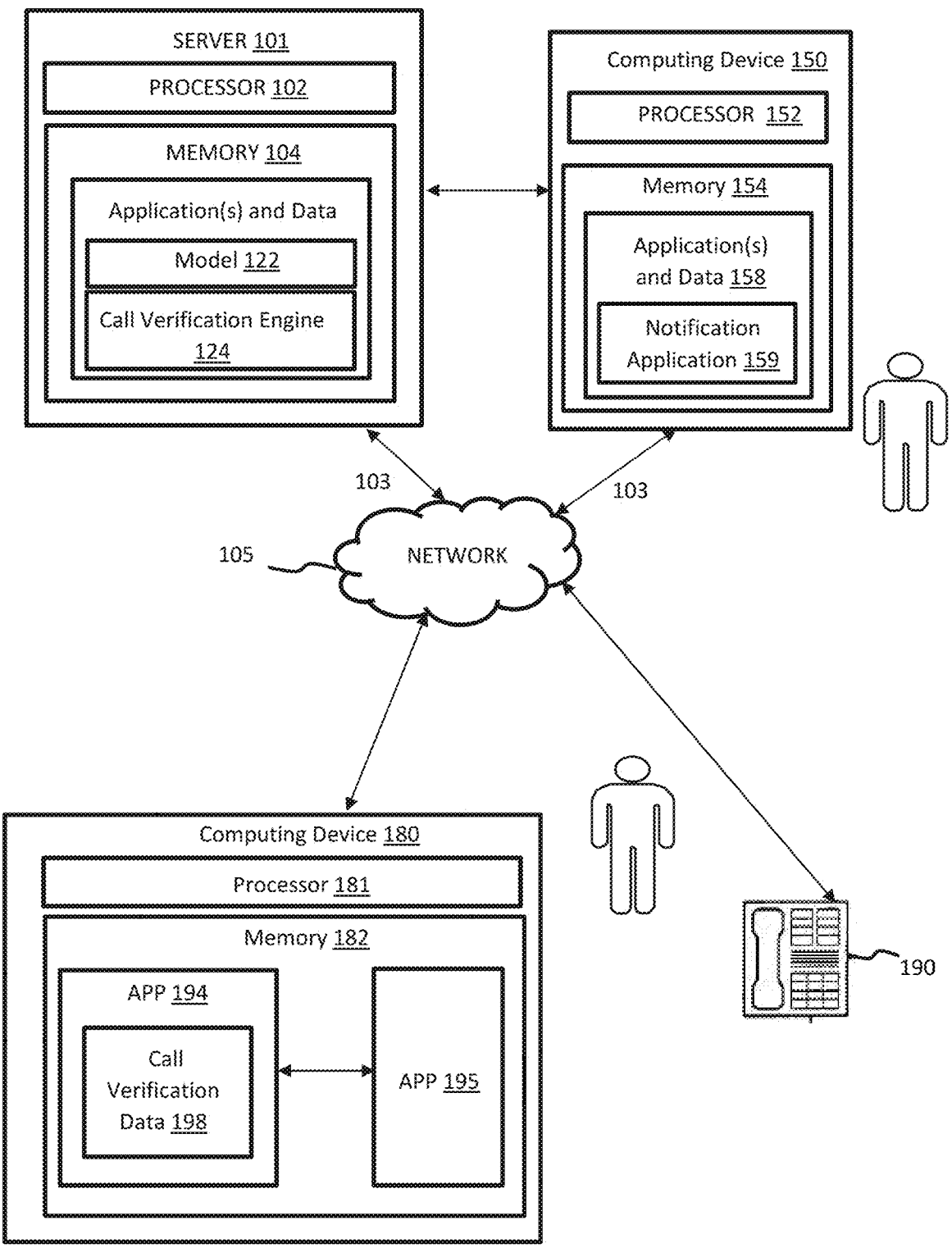
FIG. 1 is a block diagram of an exemplary system and/or platform illustrating aspects of caller identity verification, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the proliferation of smartphones, as well as the diversity of and intelligence gleaned from various communication events together with advanced data processing capabilities, various embodiments of the present disclosure provide for improved computer-based platforms or systems, improved computing components and devices configured for one or more practical technological improvements involving: configuring a notification application to allow a calling party associated with an entity to communicate an indication when the calling party initiates a call to a call recipient party; detecting that the call is being received from the calling party by the call recipient party; updating an appearance of an icon of an application that is associated with the entity and installed at a smartphone of call recipient party such that to indicate, to the call recipient party, that the call is incoming from the calling party associated with the entity; as well as generating intelligence (e.g., machine learning models, etc.) empowered by the various call related events, phone numbers deemed as associated with legitimate entities, phone numbers deemed as associated with spammers or fraudsters spoofing the identities of legitimate entities, user profile information and user contextual information, and/or legitimate entity profile information and contextual information to, for example, automate the verification and/or notification of whether phone numbers of incoming calls are associated with fraudulent parties which pretend as the legitimate entities to engage in various security attacks (e.g., vishing sensitive, private, or security related data) with enhanced efficiency, accuracy, relevancy, and accessibility.

As detailed herein, typically, various computer-based technological problems may arise when computer technology may be utilized by fraudsters to engage in various types of technology-facilitated fraudulent attacks. As used herein, in some embodiments, the term "vishing" refers to a fraudulent act or a security attack using verbal or audio scams or schemes to trick people into performing certain actions believed as done in their best interest or protection. Typically, in vishing, fraudsters could try to convince unsuspected users to provide them valuable information over the phone. The valuable information can include, without limitation, any sensitive information (that can be further used for additional social engineering), credit card numbers, credentials full legal names, birthdates, home addresses, billing addresses, mother's maiden names, phone numbers, credit card information, financial information, login credentials, and the like. Typically, vishing calls may exploit the fact that we're more likely to trust a human voice. Typically, the vishing attacks may differ in scope, targets and/or patterns. In some cases, a vishing attacker could spoof the identity of a legitimate entity such as a banking institute to masquerade as affiliated with the legitimate entity. In some cases, vishing attacks may also be performed via malware installed on the user's computing device and trick the user into calling the vishing attacker themselves. For example, cybercriminals may engage a vishing campaign targeting employees working from home. For example, the attackers may collect login credentials for corporate networks, which they then monetized by selling access to corporate resources to other bad actors.

Typically, vishing attacks may be sophisticated and require thorough research and a phishing setup to work. The phishing pages were made to look like a targeted company's internal VPN (Virtual Private Network) login page, and the sites were also capable of capturing multi-factor authentication or one-time passwords if the situation required. Typically, bad actors then may compile dossiers on the employees working for the companies they may want to target, typically by mass scraping of public profiles on social media platforms, recruiter and marketing tools, publicly available background check services, and/or open-source research. Typically, collected information may include: name, home address, personal cell/phone number, the position at the company, and duration at the company, according to the two agencies.

There could be the following exemplary vishing attacks:
i) Telemarketing Fraud—where fraudsters intend to scam users for payment or quick gain; for an example, 'a charity needs your help and that you can make a difference with even just a small donation;' in such case, the charities don't exist, and the donated money ends up in the hands of the fraudsters;
ii) Government Impersonations—where fraudsters impersonate the government (usually Tax Authorities, Social Security and so on) to scam the users; fraudsters may use the emergency of a situation to request payments;
iii) Tech Support Fraud—fraudsters pretending to be tech support for a company; the fraudster may inform the user that something is wrong with their device and they'd need remote access to fix it; later, they'd charge the user for a resolving an issue that didn't even exist;
iv) Bank or Financial Institutions Impersonations—financial vishing scams often involve an actor impersonating a bank, credit card company, or another financial institution to get information about your personal, financial, or account credentials.

Typically, vishing is just one form of phishing, which is any type of message—such as an email, text, phone call or direct-chat message—that appears to be from a trusted source, but isn't. Typically, the goal is to steal someone's identity and/or money. Typically, one computer-based telecommunication technological problem, involving vishing or any other type of phishing attacks, may be due to the fact that computer-based telecommunication technology may make it easier to contact more people. For example, scammers may place hundreds of calls at a time using voice over internet protocol (VoIP) technology and can spoof the caller ID to make the call appear to come from a trusted source or legitimate entity, such as one's bank.

Various embodiments disclosed herein may be implemented to provide technical solutions to at least the above-described vishing attacks and other security attacks that take advantage of computer-based telecommunication technologies. For example, embodiments of the disclosed herein may communicate, to a call receiving party, a reliable notification or a notification verified with a degree of confidence with regard to the identify information of the calling party associated with the call. Assisted with such a notification, the call receiving party may be afforded with accurate (and/or with qualified accuracy) and operative information to assess the real identity of the calling party, in real time or near real time. Further, some embodiments of the disclosed herein may harvest various security attacks related call events from call receiving parties as training data (and/or crowdsourced data) to accurately and efficiently train machine learning models to predict whether an incoming call from an unknown number is an attacking attempt or a legitimate communication.

Various embodiments disclosed herein may be implemented in connection with one or more entities that provide, maintain, manage, and/or otherwise offer any services relating to user verification or user authentication system(s). In some embodiments, the exemplary entity may be a financial service entity that provides, maintains, manages, and/or otherwise offers financial services. Such financial service entity may be a bank, credit card issuer, or any other type of financial service entity that generates, provides, manages, and/or maintains financial service accounts that entail providing a transaction card to one or more customers, the transaction card configured for use at a transacting terminal to access an associated financial service account. In some embodiments, financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary computer-based system 100 illustrating aspects of technologically improved caller identity verification via utilization of an improved call center, and/or at least one machine learning technique, in accordance with one or more embodiments of the present disclosure. An exemplary system 100 may include at least one server 101, and at least one computing device 180 associated with a user, which may communicate 103 over at least one communication network 105. In some embodiments and in optional combination with one or more embodiments described herein, the system 100 may further include and/or be operatively connected and/or be in electronic communication with a computing device 150 associated with a call center, from which the computing device 180 may receive a call or any other forms of communication via various respective communication channels such as, but not limited to, SMS, MMS, emails, social media services, chat services, etc. In some embodiments and in optional combination with one or more embodiments described herein, the system 100 may further include and/or be operatively connected and/or be in telephonic communication with a landline telephony device 190 associated with the user, which may also receive a telephonic call from the computing device 150.

Although embodiments herein use examples involving phone calls to illustrate the improved features and functionality associated with caller verification and notification against security attacks, it should be understood that any other forms of communications vulnerable to security attacks can be protected using various embodiments of the disclosure with enhanced user security and privacy enabled by communication source verification and/or notification.

Still referring to FIG. 1, in some embodiments, the computing device 150 may be hosted or implemented at the server 101 such that various call center features together with the functionality associated with the server 101 may be implemented for the same entity such as, for example, the financial service entity described above. For instance, the server 101 may include a voice over IP server such that the server 101 may both initiate calls and furnish the caller identity verification and notification with regard to the calls placed to the computing device 180.

In other embodiments, the computing device 150 may be implemented at one or more computing devices independent of the server 101 so as to separate the communication capabilities from the features and functionality of the server 101. For example, in some embodiments, the server 101 may be configured to enable or provide the features and functionality of caller identity verification and/or notification for calls received at the computing device 180 from a multitude of call centers that may be associated with multiple entities. By way of non-limiting examples, an agent initiating calls at the computing device 150 of a call center may be associated with an entity such as a banking entity, an online retailer, an entity providing a streaming service, a gaming service, an email service, a social media site, a chat service, and the like. In other embodiments, the computing device 150 may be associated with an individual agent associated with one or more entities as described above, instead of the call center. In this scenario, the call center may be in a distributed and/or virtual form such that an individual agent may utilize a computing device not physically located at a centralized, physical building or facility to conduct various communications with the user via communication channels enabled at the computing device 180 and the telephone device 190. Although the following illustrates embodiments of the present disclosure using an example where the computing device 150 is associated with a central call center, it should be understood that various embodiments of the present disclosure can be applied to any configurations of call centers, not limited by examples herein.

As shown in this illustrative embodiment, the computing device 150 may include at least one processor 152, and a non-transient memory 154, such as random-access memory (RAM). In one embodiment, the memory 154 may include a notification application 158 that, when executed by the at least one processor 152, may perform various procedures, operations, or processes consistent with disclosed embodiments such as transmitting an indication upon an agent (as above-described) initiating a call to the computing device 180 or the telephony device 190 of the user, more details of which are described with reference to FIG. 3, below.

In some embodiments, server 101 may include computers, servers, mainframe computers, desktop computers, etc. configured to execute instructions to perform server and/or client-based operations that are consistent with one or more aspects of the present disclosure. In some embodiments, server 101 may include a single server, a cluster of servers, or one or more servers located in local and/or remote locations. In some embodiments, server 101 may be stand-alone, or it may be part of a subsystem, which may, in turn, be part of a larger computer system. In some embodiments, server 101 may be associated with an entity such as a financial institution, such as a credit card company that services an account of the user, and thereby in a need to initiate communicates with the user regarding various aspects of the account and/or services thereof. For example, the credit card company may contact the user with regard to a new credit card offering campaign, alerting the user of a transaction suspected as unauthorized, responding to a callback service request, and the like.

Still referring to FIG. 1, server 101 may include at least one processor 102, and a non-transient memory 104, such as random-access memory (RAM). In some embodiments, memory 104 may store application(s) and data 108. Various embodiments herein may be configured such that the application(s) and data 108, when executed by the processor 102, may provide all or portions of the features and/or functionality associated with caller identity verification and notification, in conjunction with or independent of caller identity verification implemented at the computing device 180. As illustrated with reference to FIG. 3 below, in some embodiments, the server 101 may perform caller identity verification and notification based on indications transmitted from the notification application 158 executing at the computing device 150. In other embodiments, as illustrated with reference to FIG. 4 below, the server 101 may perform caller identity verification and notification utilizing one or more machine learning techniques instead.

In some embodiments, the features and functionality performed by the server 101 may include operations such as: obtaining training data (e.g., training call events including phone numbers determined to be associated with a plurality of legitimate entities, training call events including phone numbers determined to be associated with a plurality of users spoofing the identities of the plurality of legitimate entities, and/or the profile information and/or contextual information associated with the first plurality of users or the legitimate entities); training a call verification machine learning model with the training data; obtaining a trained call verification machine learning model that determines a likelihood of when a phone number is associated with a fraudulent entity or a legitimate entity; receiving an indicator identifying a permission by the user to detect phone calls, emails, messages, and/or other communications received at the computing device 180; receiving an indication from the computing device 150 that a call has been initiated by the calling party to the user; receiving an indication that the call initiated by the calling party is being received by a computing device of the user; utilizing the trained call verification machine learning model to determine a likelihood that the calling party is associated with an entity; determining an application that is associated with the entity and installed on the computing device 180; and instructing the application to update an appearance of the icon associated with the application to display an indicator with regard to the determination about the calling party being associated with the entity. In some embodiments not shown herein, the features and functionality of the server 101 may be partially or fully implemented at the computing device 180 such that the illustrative caller identity verification and notification process may be performed partially or entirely on the computing device 180, associated with the user.

In some embodiments, the application(s) and data 108 may include an exemplary call verification machine learning model 122. In some embodiments, the call verification machine learning model 122 may be trained at the server 101. In other embodiments, the call verification generation machine learning model 122 may be trained by another entity with the training data provided by another entity, and/or with the training data provided by server 101. In one embodiment, the server 101 and/or the computing device 180 may record a whitelist of the phone numbers associated with the calls that are accompanied with indications from the notification application 158 executing on the computing device 150. In this scenario, the server 101 and the computing device 180 may use this whitelist of the phone numbers as the training legitimate phone numbers (e.g., positive training data) to train the call verification machine learning model 122. In some embodiments, the call verification machine learning model 122 may also be trained and re-trained at the computing device 180 associated with the user. In the latter case, the call verification machine learning model 122 may be trained and/or re-trained with training data specific to the user at the computing device 180. In one embodiment, the computing device 180 may record a blacklist of phone numbers associated with the calls not triggering an updated appearance of the icon of the application. The blacklisted phone numbers may be transmitted to the server 101 and/or utilized locally as training spoofed phone numbers (e.g., negative training data) to train the call verification machine learning model 122.

Various machine learning techniques may be applied to train and re-train the call verification machine learning model 122 with training data and feedback data, respectively. In various implementations, such a machine learning process may be supervised, unsupervised, or a combination thereof. In some embodiments, such a machine learning model may include a statistical model, a mathematical model, a Bayesian dependency model, a naïve Bayesian classifier, a Support Vector Machine (SVMs), a neural network (NN), and/or a Hidden Markov Model.

In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of neural network may be executed as follows:

a. Define Neural Network architecture/model,
b. Transfer the input data to the exemplary neural network model,
c. Train the exemplary model incrementally,
d. determine the accuracy for a specific number of timesteps,
e. apply the exemplary trained model to process the newly-received input data,
f. optionally and in parallel, continue to train the exemplary trained model with a predetermined periodicity.

In some embodiments and, optionally, in combination of any embodiment described above or below, the exemplary call verification machine learning model 122 may be in the form of a neural network, having at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the application(s) and data 108 may include a call verification engine 124 that may be programmed to execute the exemplary call verification machine learning model 122. In some embodiments, the call verification engine 124 may receive, as input, a phone number associated with a call incoming at a computing device of the user and from a calling party claiming to be associated with a particular entity. Utilizing the call verification machine learning model 122, the call verification engine 124 may determine a likelihood that the calling party is indeed associated with the particular entity. Subsequently, the determined likelihood may be transmitted to the computing device 180 to trigger an update to the appearance of the icon of the application accordingly. More details of the call verification machine learning model 122 and the call verification engine 124 are described with reference to FIG. 4, below.

Still referring to FIG. 1, an illustrative computing device 180 associated with the user may comprise: one or more processors 181 and a non-transient computer memory 182. Memory 182 may store instructions that, when executed by the one or more processors 181, perform various procedures, operations, or processes consistent with disclosed embodiments. In some embodiments, the memory 182 may include an application (APP) 195 that is associated with an entity (e.g., a banking institution, an e-commerce retailer, etc.) and when executed by the processor 181, may perform various functionality and services provided by the entity. In some embodiments not shown herein, the application 195 may be associated with a collection of one or more entities for which the server 101 may transmit call verification results or notifications. In one embodiment, the application 195 may function as a dedicated application to receive notification(s) from the server 101 with regard to the information that a pending call is from a calling party associated with a legitimate entity, as well as the identity of the legitimate entity. For example, the application 195 may have its icon modified to display to the user the identity of the legitimate entity which the calling party is associated with (e.g., display inside a bubble, similar to a bubble 204 of FIG. 2, in smaller font, etc.). In another example, in addition to having its icon modified (details of which will be described below with reference to FIGS. 2A-2F), the application 195 may, upon the user's activation, display to the user a notification of the identity of the legitimate entity with which the calling party associated via a user interface of the application 195.

As shown in this illustrative embodiment, the memory 182 may further include an application (APP) 194 that, when executed by the one or more processors 181, may perform operations such as: prompting the user for a permission to detect communications via the computing device 180 (e.g., phone calls, SMS, MMS, emails, etc.); detecting communications via the computing device 180 according to the permission obtained from the user; extracting information (e.g., the calling phone number; and texting number; the email sender address, etc.) from the detected communications; receiving a call from the computing device 150; receiving, storing, and/or updating caller verification data 198 (of the one or more phone numbers associated with respective notifications from the server 101 regarding pending incoming calls (a whitelist of phone numbers with verified caller identity), and/or one or more phone numbers not associated with respective notifications from the server 101 regarding pending incoming calls (a blacklist of phone numbers with un-verified or most likely forged caller identity); triggering the computing device 180 into modifying one or more aspects of an icon of the application 195 to display an indicator with regard to that the calling party is associated with the entity with which the application 195 is associated with; reporting one or more phone numbers stored in the call verification data 198 to the server 101; and training and re-training the call verification machine learning model 122. In various embodiments, the application 194 may be implemented in any suitable manner such as, without limitation, a standalone application, a browser extension, and the like. In some embodiments, the application 194 may further monitor the detected communications after the user engages therewith to extract further information with regard to the detected communications. For example, the application 194 may monitor the content of a conversation with the calling party to detect various characteristics suspicious of behaviors exhibited by potential fraudsters/imposters, such as, types of information sought after, tactics used, a duration of the call, a time of the call, metadata associated with the call placed via VoIP, etc. In one embodiment, when the icon of the application 195 is not modified but the user answers the call anyway, the application 194 may monitor the content of the call to determine whether the calling party is indeed associated with the entity it claims to be. If determining that the calling party forges the identity of a legitimate entity to engage, for example, a vishing attack on the user, the application 194 may blacklist the phone number in association with the identity been impersonated in the call verification data 198. Various features and functionality of the application 194 may be implemented as part of other applications, and/or implemented in multiple applications to include more than, less than the features and functionality described above, and/or with combination with any other features and functionality.

In some embodiments, the application 194 may be configured such that the functionality involving phone calls (and communications at various other communication channels) is implemented in a separate application executing on the computing device 180. For instance, such an application may be configured to detect a variety of communications of the user at the computing device 180, intercept those communications at the computing device 180, monitor those communications at the computing device 180, and/or interject one or more suitable controls (e.g., user operable controls) over those communications at the computing device 180. In some embodiments, such an application may be configured to obtain information of the communication transmitting party(ies) (e.g., the calling phone number, the communication source information), information of the communication (e.g., the time duration of a phone call), content of the communication (e.g., the identity of an SMS sending entity, the content of the conversation of a phone call). In some embodiments, such an application may be configured to obtain permissions from the user in order to execute all or part of the exemplary functionality described above.

In some embodiment, the application 194 may trigger the computing device 180 to modify an appearance of the icon of the application 195 when a pending incoming call is received from the computing device 150 at the telephony device 190 associated with the user. In this scenario, even though the calling party is initiating a call to a landline device such as telephony device 190, the server 101 may still receive from the notification application executing on the computing device 150 that a call is being placed to the particular user at a particular phone number. The server 101 may utilize various data stores to determine that the computing device 180 is also associated with the user, and thereby triggering the computing device 180 to perform a modification of an appearance of the icon associated with the application 195.

In some embodiments, for the purpose of simplicity, features and functionalities associated with the exemplary call verification machine learning model 122 (e.g., training, re-training, etc.) are illustrated as implemented by components of server 101. It should be noted that one more of those call verification machine learning model-related aspects and/or features may be implemented at or in conjunction with the computing device 180 of the user. For example, in some embodiments, the call verification machine learning model 122 may be partially trained at the server 101 with other users' call events and corresponding phone numbers determined as associated with legitimate entities and parties spoofing the identities of the legitimate entities, and in turn transmitted to the computing device 180 to be fully trained with the user specific call events and phone numbers associated with legitimate calls or spoofed calls in those call events. In another example, the converse may be performed such that the machine learning model 122 may be initially trained at the computing device 180 and subsequently transmitted to the server 101 for application and/or further training with training data from other users. Further, the call verification data 198 may also be stored entirely on the computing device 180, in conjunction with the server 101, or entirely at server 101. In some embodiments, when the call verification machine learning model 122 is trained or re-trained at the computing device 180, the call verification machine learning model 122 may be utilized to generate or update the call verification data 198 locally or in conjunction with the server 101. In an embodiment, the computing device 180 may be configured to synchronize the call verification data 198 to the server 101 for storage and/or access by computing devices of other users. In implementations, the synchronization may be performed in any suitable manner such as, for example, in a pushing manner initiated by the computing device 180, in a pulling manner initiated by the server 101, or in combination thereof.

While only one server 101, computing device 150, network 105, computing device 180, and telephony device 190 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. For instance, in some embodiments, the feature and functionality of the server 101 may be partially, or fully implemented at the computing device 180, and/or the computing device 150.

Figure 2B:
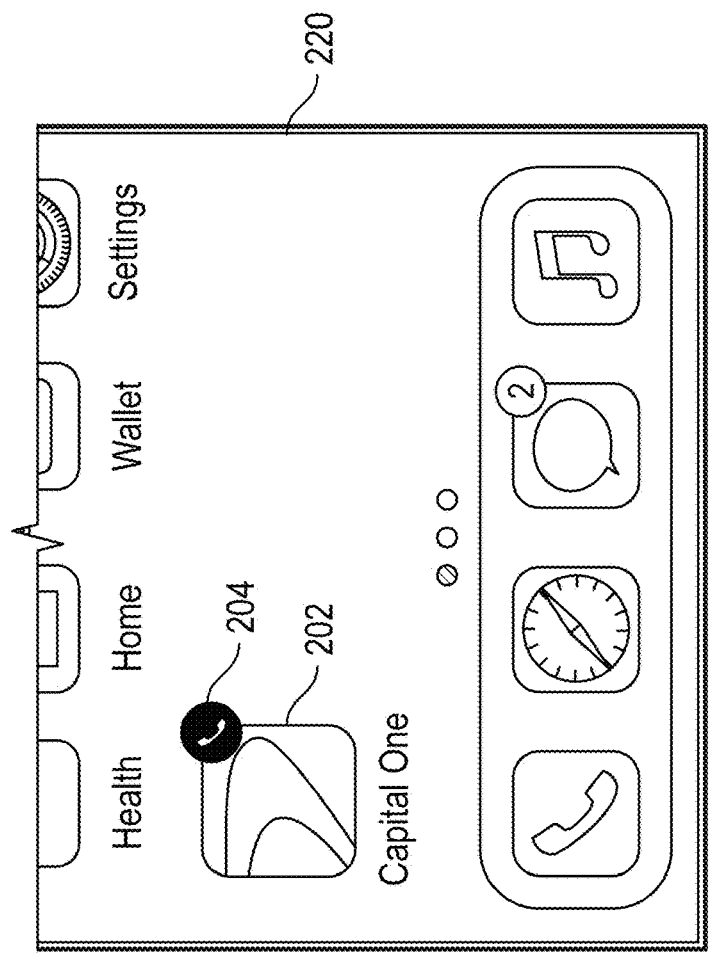
FIGS. 2A-2F are diagrams illustrating exemplary graphical user interfaces (GUIs) involving aspects and features associated with caller identity verification, consistent with exemplary aspects of certain embodiments of the present disclosure.
Figure 2A:
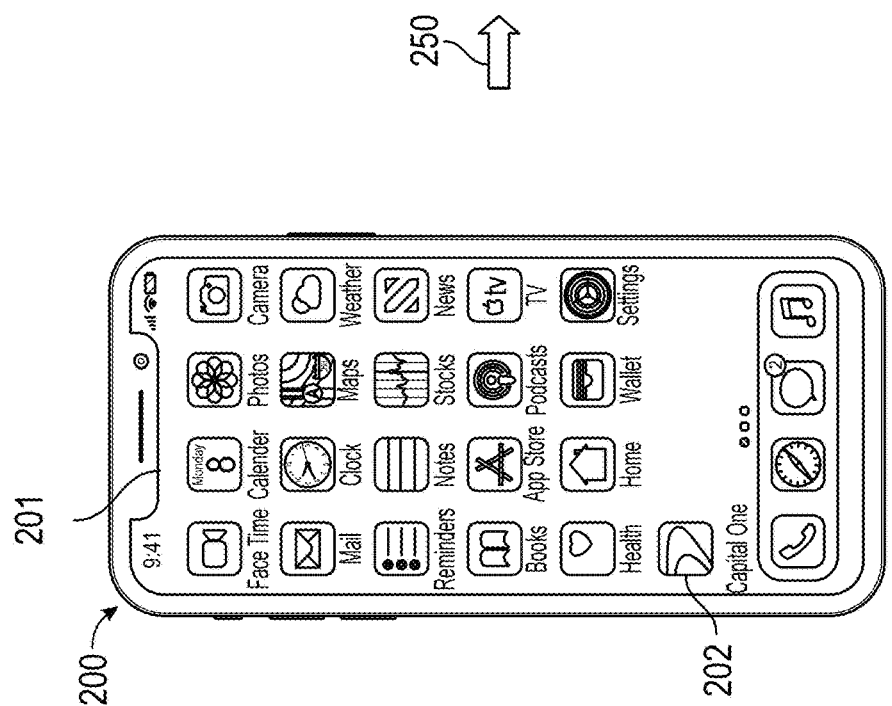
Figure 2C:
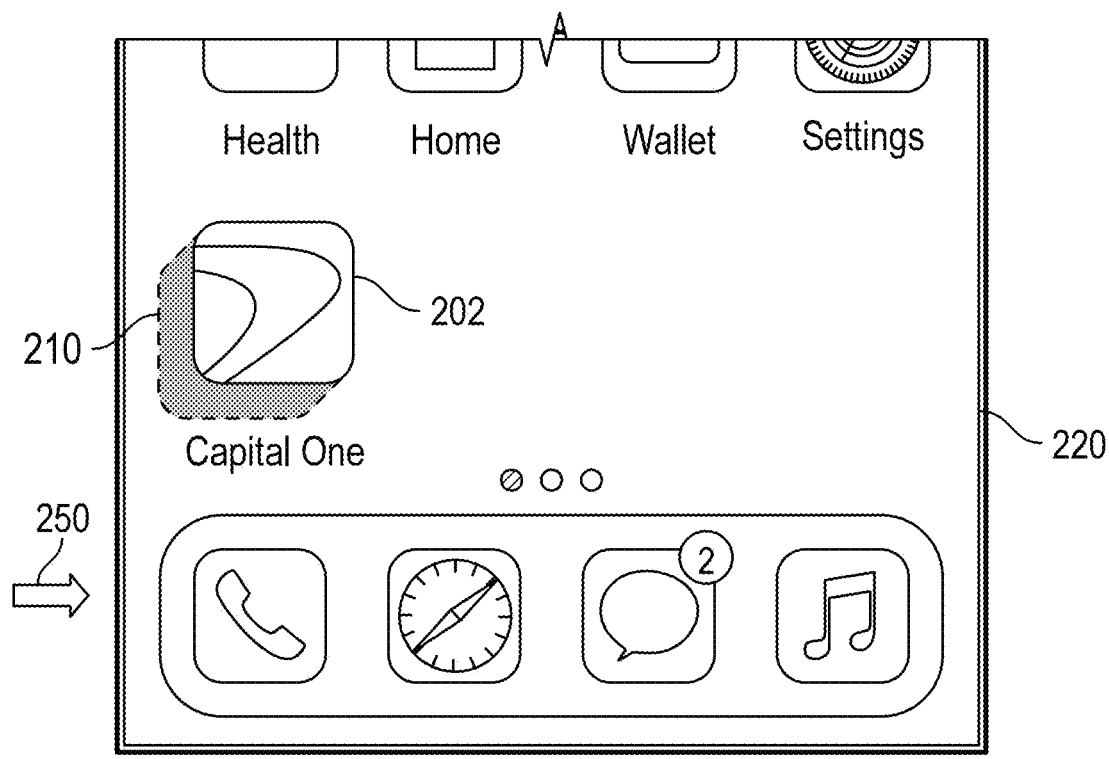
Figure 2D:
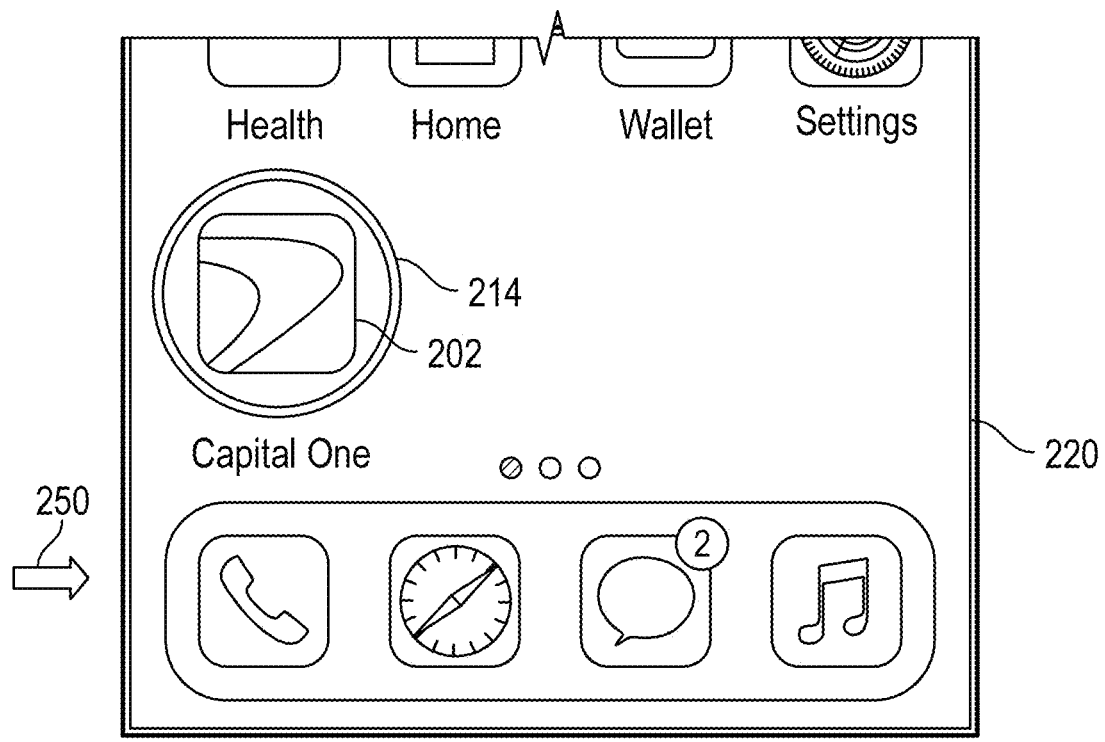
Figure 2E:
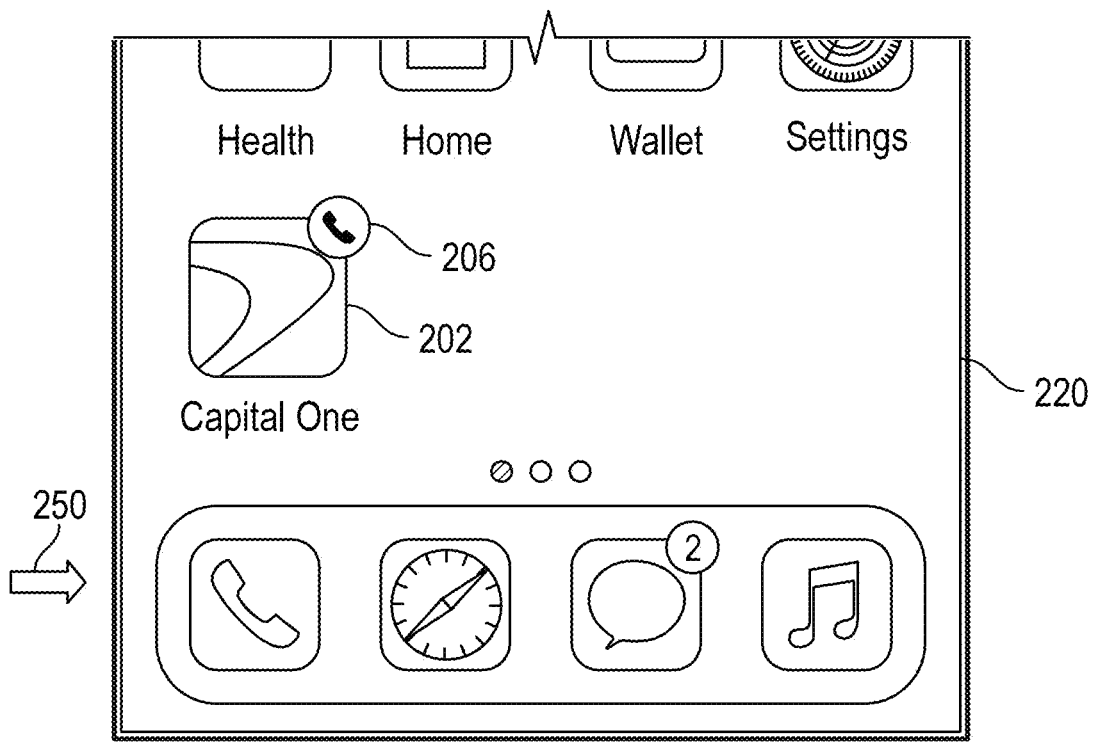
Figure 2F:
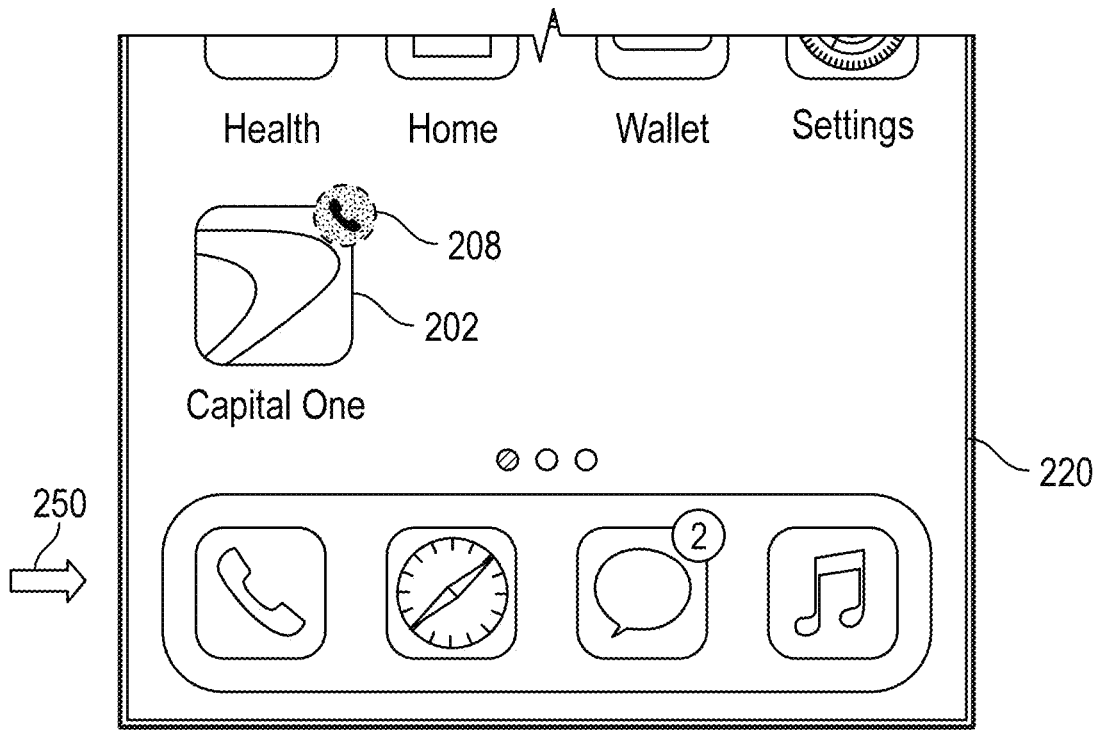

FIGS. 2A-2F are diagrams illustrating exemplary graphical user interfaces (GUIs) involving aspects associated with caller identity verification and notification, consistent with exemplary aspects of certain embodiments of the present disclosure. In some embodiments, the GUIs may be provided by the operating system of a mobile device (e.g., the computing device 180 of FIG. 1) and shown as part of a home screen on a display of the mobile device. As shown in the example of FIG. 2A, in some embodiments, prior to a call incoming at a mobile device 200, a home screen 201 may display a multitude of icons corresponding to the respective applications (e.g., the application 195 of FIG. 1) installed on the mobile device 200. One or more of the applications may be associated with legitimate entities which the user may receive communications from, via an agent on behalf thereof. In this illustrative embodiment, a particular application associated with a particular entity is installed on the mobile device 200 and accordingly, an icon 202 associated with the particular application is displayed at the home screen 201. Here, as no call is being received at the mobile device 200, the icons associated with the installed applications, including the icon 202, are displayed in their original state, for example, un-modified state.

FIGS. 2B-2F illustrate exemplary partial home screens when a phone call is being received (250) at the mobile device 200. Here, a phone call from a calling party associated with the particular entity is used as an example in the following to illustrate various aspects involving the caller identity verification and notification according to some embodiments of the present disclosure. It should be noted that embodiments of the present disclosure may be applied to any suitable communication incoming from agents/calling parties associated with any entities, not limited by the examples herein.

In some embodiments, a caller identity verification and notification process may be implemented, for example, according to a process described in more details with reference to FIG. 3 below. For example, when the incoming call is pending at the mobile device 200, a server (e.g., the server 101) has received at least one notification (e.g., an indication from the illustrative notification application (e.g., app 158) executing on the computing device 150) that the calling party is associated with a particular entity, as well as at least one notification from the mobile device 200 (e.g., an indication from the application 194 executing on the computing device 180) that there is a pending incoming call. Here, after verifying the calling party's identity as an agent associated with the particular entity, based on the notification from the notification application 158, the server may instruct the mobile device 200 to determine whether an application associated with the particular entity is installed thereon. In this example, as shown in the partial home screen 220 of FIG. 2B, the mobile device 200 has identified the application associated with the particular entity being installed and accordingly, an illustrative icon 202 may be displayed in a modified state to show a bubble 204 at its right upper corner. Here, the bubble 204 is displayed in a solid dark color and depicts a phone icon inside to notify to the user that the pending call has been verified as incoming from an agent associated with the particular entity.

In various embodiments, any suitable modification may be applied to update the appearance of the icon 202 to notify to the user with regard to the verification result for the calling party. For example, as shown in the partial home screen 220 of FIG. 2C, instead of displaying the bubble 204 of FIG. 2B, the icon 202 is updated to display a drop shadow 210 underneath. For another example and as shown in FIG.

2D, instead of displaying the bubble 204 of FIG. 2B, the icon 202 is updated to display a circle 214 at its outer perimeter.

In some embodiments, the icon 202 may be updated to display to the user with a binary notification, e.g., a yes (affirmative) or no (negative) notification, with regard to whether the calling party is indeed associated with the particular entity. In some scenarios, absent a notification from the notification application 158, as an exemplary form of negative notification, the incoming call may not trigger any updates to the appearance of the icon 202. As a result, a home screen similar to the home screen 201 may be displayed to the user with the icon 202 depicted in its original state, despite that there is an incoming call pending. Noting that in this case, as the incoming call is still pending the mobile device 200, the user may look for the absence of any updates to the icon 202 (e.g., the absence of the bubble 204, the drop shadow 210, or the circle 214, etc.) and therefore determine that the call has been verified as not incoming from an agent associated with the particular entity. In should be noted that any suitable techniques may be applied to modify the icon 202 to indicate a binary verification result, not limited by the examples herein.

In some embodiments, exemplary caller identity verification and notification process may involve one or more machine learning techniques, the details of which are described with reference to FIG. 4, below. In those scenarios, for the incoming call pending, a server (e.g., the server 101) may utilize a trained call verification machine learning model to determine a likelihood of that the calling party is associated with the particular entity, and in turn transmitted the likelihood to the mobile device 200. Accordingly, the mobile device 200 may modify the appearance of the icon 202 to notify the user with regard to the received verification result (e.g., the likelihood).

Compared to the notification of the binary type of verification result as illustrated in FIG. 2B, here, the appearance of the icon 202 may be modified in a manner to indicate to the user with a range of values corresponding to the verification result that includes a likelihood. In one example, as shown in the partial home screen 220 of FIG. 2E, the incoming call has triggered the icon 202 to be displayed in an exemplary modified state to show a bubble 206 at its right upper corner. Here, the bubble 206 is displayed in a solid opaque color and depicts a phone icon inside to notify to the user that the pending call has been verified as likely not incoming from an agent associated with the particular entity. In another example, the incoming call has triggered the icon 202 to be displayed in another exemplary modified state to show a bubble 208 filled with a color in a gradient that is between the solid color of the bubble 204 and the opaque color of the bubble 206. Here, the color gradient may be used to indicate a visual cue corresponding to the value of the verification likelihood.

In various embodiments, any suitable techniques may be applied to modify the appearance of the icon 202 to notify to the user of the verification result that corresponds to a value in a range of likelihood values. For example, the drop shadow 210 and the outer circle 214 may be rendered to be filled with a color selected from a range of visual cues that correspond to the likelihood values. For another example, the outer circle 214 may be rendered as a partial outer circle partially enclosing the icon 202, with the percentage of enclosure indicating a value corresponding to one in the range of likelihood values.

Figure 3:
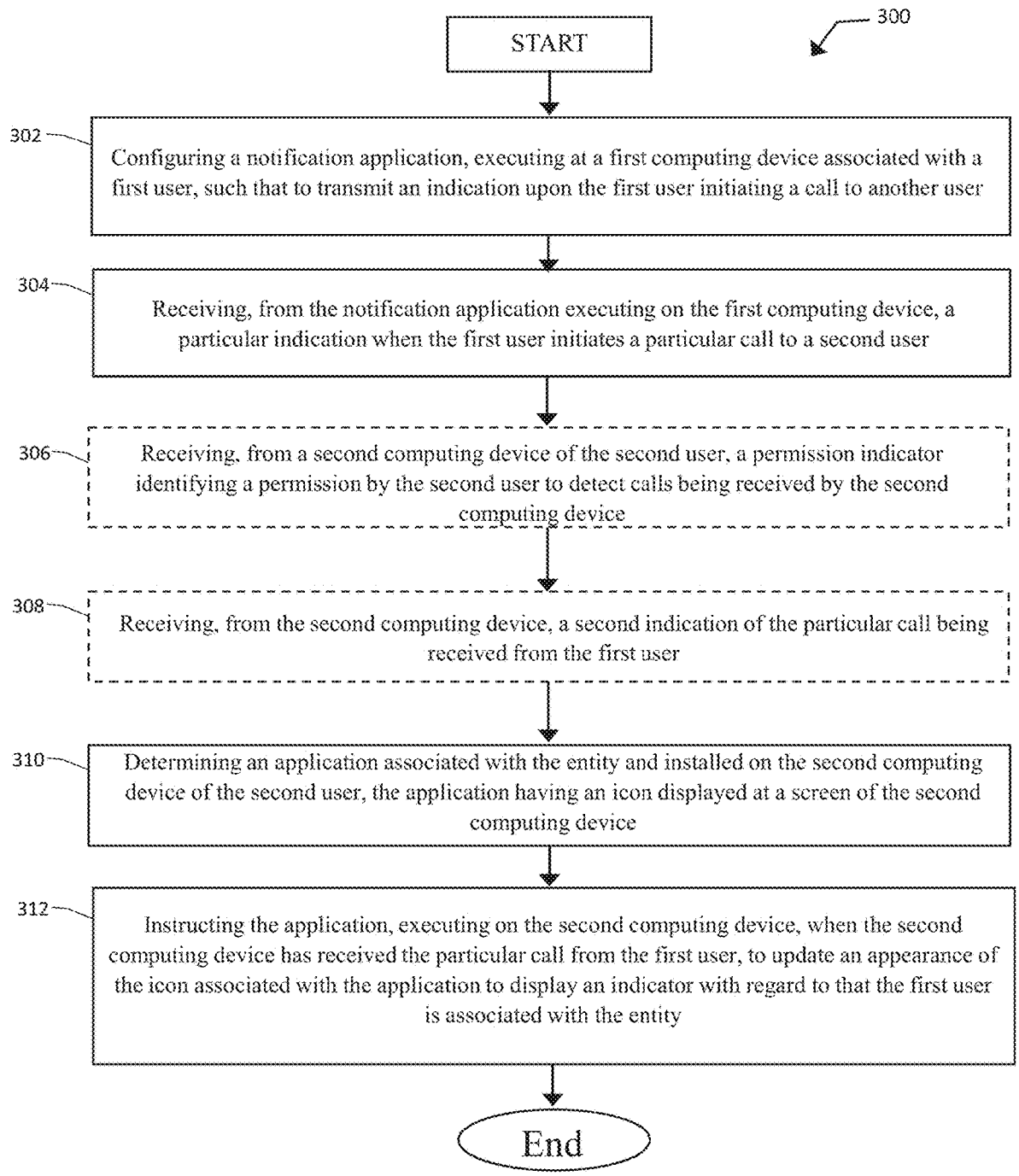
FIG. 3 is a flowchart illustrating an exemplary process related to caller identity verification and notification, consistent with exemplary aspects of certain embodiments of the present disclosure.

FIG. 3 is a flow diagram illustrating an exemplary process 300 related to caller identity verification and notification, consistent with exemplary aspects of at least some embodiments of the present disclosure. Referring to FIG. 3, the illustrative caller identity verification and notification process 300 may comprise: configuring an illustrative notification application (e.g., app 158), executing at a first computing device associated with a first user, such that to transmit an indication upon the first user initiating a call to another user, the first user associated with an entity, at 302; receiving, from the illustrative notification application executing on the first computing device, a particular indication when the first user initiates a particular call to a second user, at 304; receiving, from a second computing device of the second user, a permission indicator identifying a permission by the second user to detect calls being received by the second computing device, at 306; receiving, from the second computing device, a second indication of the particular call being received from the first user, at 308; determining application associated with the entity and installed on the second computing device of the second user, the application having an icon displayed at a screen of the second computing device, at 310; and instructing the application, executing on the second computing device, when the second computing device has received the particular call from the first user, to update an appearance of the icon associated with the application to display an indicator with regard to that the first user is associated with the entity, at 312. In other embodiments, the caller identity verification and notification process 300 may be carried out, in whole or in part, in conjunction with a server, a transacting device, and/or a mobile device that is connected via one or more networks to the server, which is executing instructions for performing one or more steps or aspects of various embodiments described herein.

In some embodiments, the caller identity verification and notification process 300 may include, at 302, a step of configuring an illustrative notification application (e.g., app 158), executing at a first computing device associated with a first user, such that to transmit an indication upon the first user initiating a call to another user, the first user associated with an entity. In some embodiments, the illustrative notification application may be implemented as the notification application 158 executing on the computing device 150. In some embodiments, the first user may be a customer representative associated with an entity such as a banking institution, and the like. In some implementations, the first user may be associated with more than one entity. As described with reference to FIG. 1, the first computing device may be located at a calling center associated with the entity, or be any computing device the first user may utilize to place calls on behalf of the entity.

In some embodiments, the caller identity verification and notification process 300 may include, at 304, a step of receiving, from the illustrative notification application executing on the first computing device, a particular indication when the first user initiates a particular call to a second user. In some embodiments, the illustrative notification application may be used by the first user to manually generate and transmit the indication upon the first user initiating a call to the second user. In other embodiments, the illustrative notification application may be configured to automatically detect the first user's initiation of a call to the second user and consequently generate and transmit such indication. In one example, the indication may include information such as the identity information of the entity on behalf of which the first user is placing the call (or claims to be associated with), and the information of the second user (e.g., phone number, username, etc.).

In some embodiments, the caller identity verification and notification process 300 may include, at 306, a step of receiving, from a second computing device of the second user, a permission indicator identifying a permission by the second user to detect calls being received by the second computing device. In some embodiments, the permission indicator may be received from an application such as the application 194 executing on a computing device of the user. The details are similar to those described with reference to FIG. 1, and not repeated herein. In other embodiments, the permission indicator may be received from an application such as a web page allowing the user to configure his or her settings at a web browser. The user may configure the settings related calls, and/or other communication detection capabilities for various computing devices thereof. That is, the permission indicator may be received from an application and/or a computing device other than the application for detecting calls (and other communications), or the computing device on which the call detecting/verification application is executing.

In some embodiments, the caller identity verification and notification process 300 may include, at 308, a step of receiving, from the second computing device, a second indication of the particular call being received from the first user. Although embodiments herein are illustrated using phone calls as examples, it should be understood that such verification and/or notification can be applied to other communications (e.g., an SMS message, an MMS message, an email message, a voice message, a chat message, etc.), not limited by the embodiments illustrated herein.

In some embodiments, the caller identity verification and notification process 300 may include, at 310, a step of determining an application associated with the entity and installed on the second computing device of the second user, the application having an icon displayed at a screen of the second computing device. In some embodiments, using identity information included in the indication from the illustrative notification application, the applications installed on the second computing device may be queried, for example, via its metadata, to determine whether there is an application associated with the entity. Any suitable techniques may be applied to match an installed application with the identity information of the entity, not limited by the examples herein.

In some embodiments, the caller identity verification and notification process 300 may include, at 312, a step of instructing the application, executing on the second computing device, when the second computing device has received the particular call from the first user, to update an appearance of the icon associated with the application to display an indicator with regard to that the first user is associated with the entity. In various embodiments, the appearance of the icon associated with the application may be updated as described above with reference to FIGS. 2A-2D, and the details are not repeated herein. For example, the indicator may include one or more of: an outline surrounding the icon, a drop shadow on the icon, and a bubble on the icon. For another example, the indicator may be displayed in an on or off mode such that, the on mode may display the indicator to notify the second user that the first user is indeed associated with the entity. On the other hand, the off mode may not display the indicator, despite the pending incoming call, thereby notifying the second user that the first user is not associated with the entity. In some embodiments, the appearance of the icon may be updated prior to the second user answers the call from the first user.

In some embodiments, the caller identity verification and notification process 300 may skip one or both of the steps 306 and 308 and proceed directly to the steps 310 and then 312. In some scenarios, the first user may initiate a call to a phone number established as a landline phone number that is also associated with the second user. In one example, as illustrated with reference to FIG. 1, the first user may place a call to the telephony device 190 associated with the second user at a non-mobile (landline) phone number. In some implementations, the second user may have registered the landline phone number in association with a call verification and notification server (e.g., the server 101) such that a call incoming at the landline phone number may similarly trigger the second computing device associated with the same second user to notify that the first user placing the call incoming at the telephony device 190 is associated with the entity.

Figure 4:
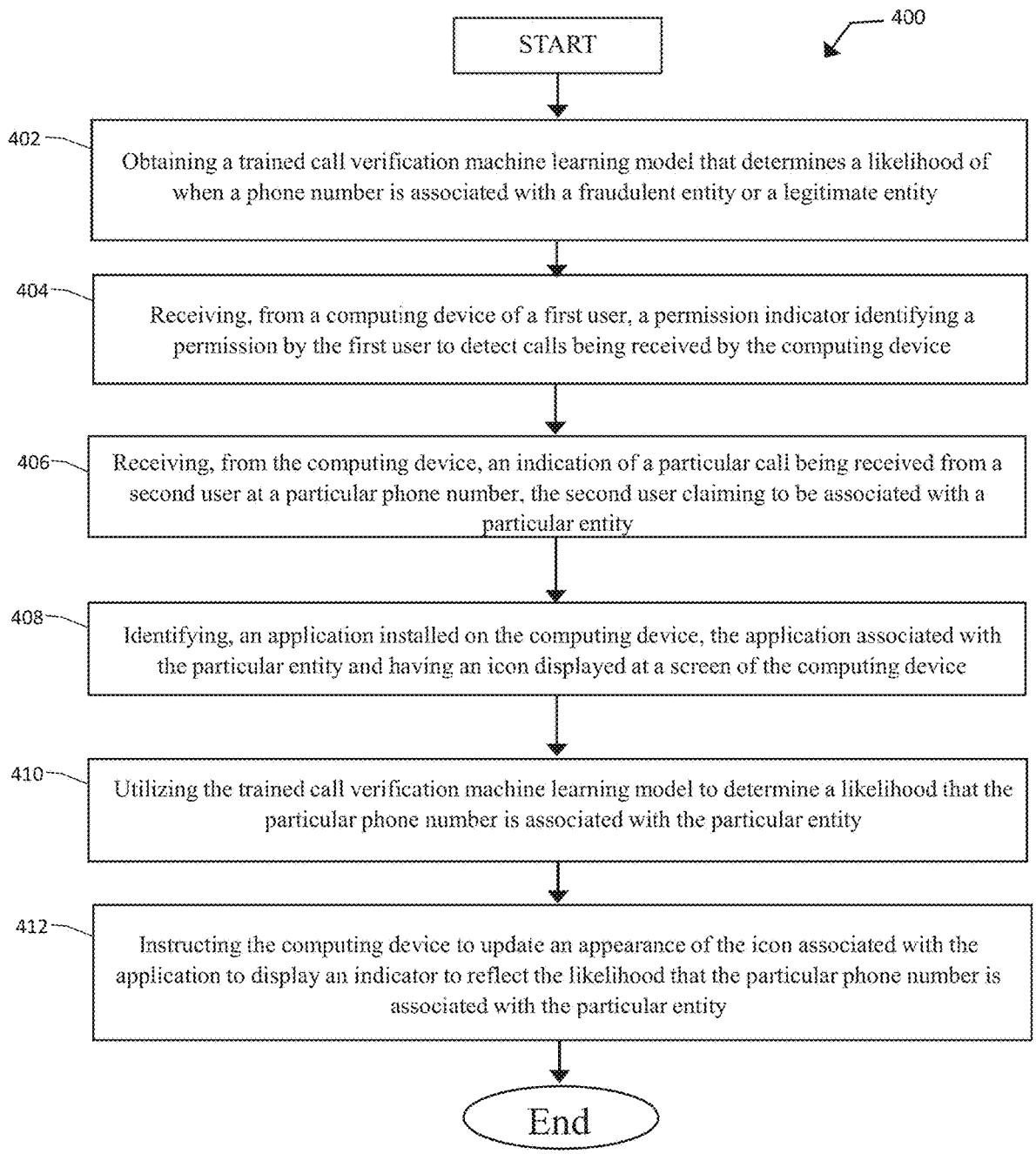
FIG. 4 is a flowchart illustrating an exemplary process related to caller identity verification and notification, consistent with exemplary aspects of certain embodiments of the present disclosure.

FIG. 4 is a flow diagram illustrating an exemplary process 400 related to caller identity verification via machine learning techniques, consistent with exemplary aspects of at least some embodiments of the present disclosure. Referring to FIG. 4, the illustrative caller identity verification and notification process 400 may comprise: obtaining a trained call verification machine learning model that determines a likelihood of when a phone number is associated with a fraudulent entity or a legitimate entity, at 402; receiving a permission indicator identifying a permission by the first user to detect calls being received by a computing device, at 404; receiving from the computing device, an indication of a particular call being received from a second user at a particular phone number, the second user claiming to be associated with a particular entity, at 406; identifying an application installed on the computing device, the application associated with the particular entity and having an icon displayed at a screen of the computing device, at 408; utilizing the trained call verification machine learning model to determine a likelihood that the particular phone number is associated with the particular entity, at 410; and instructing the computing device to update an appearance of the icon associated with the application to display an indicator to reflect the likelihood that the particular phone number is associated with the particular entity, at 412. In other embodiments, the caller identity verification process 400 may be carried out, in whole or in part, in conjunction with a server, a transacting device, and/or a mobile device that is connected via one or more networks to the server, which is executing instructions for performing one or more steps or aspects of various embodiments described herein.

In some embodiments, the caller identity verification and notification process 400 may include, at 402, a step of obtaining a trained call verification machine learning model that determines a likelihood of when a phone number is associated with a fraudulent entity or a legitimate entity. With regard to the disclosed innovation, the call verification machine learning model may be trained based at least in part on one or more of: (i) a first plurality of training call events including a plurality of training phone numbers determined to be associated with a plurality of legitimate entities, the first plurality of training call events associated with a plurality of users; (ii) a second plurality of training call events including a plurality of training phone numbers determined to be associated with users spoofing the identity of the plurality of legitimate entities, the second plurality of training call events associated with the plurality of users; (iii) one or both of profile information or contextual information of the plurality of users; and/or (iv) one or both of profile information or contextual information of the plurality of legitimate entities.

In some embodiments, the plurality of training phone numbers determined to be associated with the plurality of legitimate entities may be obtained or otherwise identified via various resources and/or services. For example, those phone numbers may be published from the plurality of legitimate entities themselves, reported from the application 194 according to the whitelist of the call verification data 198, and the like.

In some embodiments, the plurality of training phone numbers determined to be associated with the users spoofing the identities of the plurality of legitimate entities may be obtained or otherwise identified via various resources and/or services as well. In some examples, these phone numbers associated with vishing calls or spam calls may be reported by the plurality of users, and/or identified by the blacklist of the call verification data 198 of a call verification application (e.g., the application 194) and reported to a server (e.g., the server 101 of FIG. 1), and/or agencies such as the Federal Trade Commission, Internet Crime Complaint Center, and the like. In those cases, a database recording the phone numbers associated with those vishing calls (attempted or successful) may be accessed to retrieve the training phone numbers in association with the related incidents.

According to some aspects of the disclosure, equipped with the vast amount of data corresponding to call events related vishing attacks (and/or phishing attacks at other communication channels), the exemplary trained call verification machine learning model may classify the plurality of legitimate entities into categories based on a variety of characteristics associated with the services or functions provided thereby, user profile information of the plurality of user, user contextual information of the plurality of user, and/or entity profile information and/or contextual information of the plurality of legitimate entities, and so on. For example, for an incoming call submitting to be related to banking services, the phone numbers deemed as presenting security risks may be provided by the call verification machine learning model as the phone numbers for all the entities that provide banking services. When queried with an entity that is known to the call verification machine learning model, the call verification model may output a list of one or more phone numbers crowdsourced, and/or augment the crowdsourced list with one or more phone numbers identified based on above described call verification process, profile, and/or contextual information. For instance, regardless of the category of the known entity associated with an incoming call, given the context of a recent or ongoing large scale vishing attacks in the geo-area where the user who received the call resides or travels to, the call verification model may augment the list with the dynamically identified phone numbers deemed as presenting security risks. On the other hand, for an entity unknown to the call verification model, the call verification model may output a list using the trained knowledge and intelligence. For example, the call verification model may classify the unknown entity into one or more categories and use the category information to retrieve all or portions of the phone numbers deemed as presenting security risks to the one or more categories of entities. Further, the call verification model may also process these phone numbers for filtering and/or augmenting based on profile/contextual information, and the like.

According to various aspects of the disclosure, the call verification machine learning model may be trained to classify the training data into various types of categories/feature sets based on information such as geographical information, timing information, user browsing history, user transaction history, entity activities, and so on. For example, the training data may include the profile/contextual data of the plurality of users and/or the profile/contextual data of the plurality of legitimate entities captured and recorded in association with the blacklist of the call verification data 198. This way, when provided with a phone number and identity information of an entity associated with an incoming call, the call verification machine learning model may determine a likelihood of whether the phone number is spoofing the identity of the entity or not, for example, based on the same geo-area, a similar timing pattern, a similar browsing history, a similar transaction history, a similar entity activity, and so on.

The user profile information may comprise information relating to one or more of: demographic information, account information, application usage information, any data provided by the user, any data provided on behalf of the user, and the like. The contextual aspect of the user profile information and user contextual information may comprise information relating to one or more of: a timing, a location of the user, an action of a user, calendar information of the user, contact information of the user, habits of the user, preferences of the user, purchase history of the user, browsing history of the user, communication history, travel history, on-line payment service history, profile and/or contextual information of individual(s) and entity(ies) the user is associated with, and the like. In some embodiments, the user profile information and/or user contextual information may be provided by the user, detected by a server (e.g., the server 101 of FIG. 1), and/or a component external thereto, or in a combination thereof.

The entity profile information may comprise information relating to one or more of: type of business, headquarter location, branch location, employee information, management information, revenue information, press release information, product release information, stock information, privacy information, marketing campaign information, any data provided by the entity, and the like. The contextual information of an entity may comprise information related to one or more of: a timing, an event that triggers the entity into authentication users, communication portals used for authenticating users, incidents reported in association with authenticating users, and the like.

In some embodiments, the call verification machine learning model may be trained via a server (e.g., the server 101 of FIG. 1), such as a processor of a computer platform, or an online computer platform. In some embodiments, the processor is associated with an entity that provides a financial service to the user. Here, for example, the at least one computer platform may comprise a financial service provider (FSP) system. This FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. In other embodiments, the FSP system may outsource the training to a third-party model generator, or otherwise leverage the training call events, the training phone numbers determined as associated with legitimate entities, the training phone numbers determined as spoofed and associated with fraudsters impersonating legitimate entities, training user profile/contextual information, training entity profile/contextual information, and/or trained models from a third-party data source, third-party machine learning model generators, and the like.

It should be further understood that, in some embodiments, the call verification machine learning model may be trained via a server in conjunction with a computing device of the user. Here, for example, the server may be configured to initially train a baseline call verification model based on the above-described training data of the first plurality of users (not including the user) and/or a plurality of such training data from the plurality of third-party data sources. Subsequently, the baseline call verification model may be transmitted to the computing device associated with the user to be trained with the particular training data of the user. In other words, a call verification model may be trained in various manners and orders as a user-specific model in implementations.

The caller identity verification and notification process 400 may include, at 404, a step of receiving a permission indicator identifying a permission by the first user to detect calls being received by a computing device; at 406, a step of receiving from the computing device, an indication of a particular call being received from a second user at a particular phone number, the second user claiming to be associated with a particular entity; and at 408, a step of identifying an application installed on the computing device, the application associated with the particular entity and having an icon displayed at a screen of the computing device. In some embodiments, the details of one or more of the steps 404 through 408 may be similar to the steps 306 through 310 illustrated above with reference to FIG. 3, and are not repeated herein. In some embodiments, the application associated with the particular entity may be identified based on the identity information of the particular entity.

In some embodiments, the identity information of the particular entity may be extracted from caller ID information enabled and associated with the incoming call. For instance, the second user may configure a VoIP program to include the identity information of the particular entity in the caller ID information for display to the first user. In some embodiments, the identity information of the particular entity may be extracted from the content of the call after the first user answer the incoming call and engages a conversation with the second user. In some embodiments, the identity information of the particular entity may be extracted from the screening of the incoming call, a voice message left by the incoming call, and so on. With the identity information of the particular entity, The caller identity verification and notification process 400 may include, at 410, a step of utilizing the trained call verification machine learning model to determine a likelihood that the particular phone number is associated with the particular entity. Here, among other information, the phone number of the incoming call and the identity information of the particular entity may be input to the trained call verification model (e.g., the call verification model 122), which in turn may output a prediction of whether the particular phone number is associated with the particular entity. In some embodiments, the prediction may be generated as a binary value, which indicates an affirmative or a negative verification result with regard to whether the particular phone number is associated with the particular entity. In other embodiments, the prediction may be generated as a likelihood of whether the particular phone number is associated with the particular entity. In the latter case, the likelihood may be the form of a range of values such as, a percentage value, and the like. In some embodiments, a confidence score may further be generated in association with the predicted verification result.

In some embodiments, beside the phone number and the identity information of the entity associated with the incoming call, information such as the contextual/profile data of the first user, and/or the contextual/profile data of the particular entity may also be input to the trained call verification machine learning model to determine a verification result as described above. In some embodiments, phone number associated with the incoming call may be determined as at least one of: a legitimate phone number associated with the particular entity, a spoofing phone number pretending to be associated with the particular entity, and a phone number of uncertain and/or unverified legitimate association with the particular entity.

The caller identity verification and notification process 400 may include, at 412, a step of instructing the computing device to update an appearance of the icon associated with the application to display an indicator to reflect the likelihood that the particular phone number is associated with the particular entity. In various embodiments, the appearance of the icon associated with the application may be updated as described above with reference to FIGS. 2A-2F, and the details are not repeated herein. For example, the indicator may include one or more of: an outline surrounding the icon, a drop shadow on the icon, and a bubble on the icon. For another example, the indicator may be displayed in a visual cue corresponding to the likelihood, the visual cue associated with a range of visual cues corresponding to a range of values corresponding to the likelihood. In one example, the range of visual cues may correspond to a range of color gradients.

Figure 5:
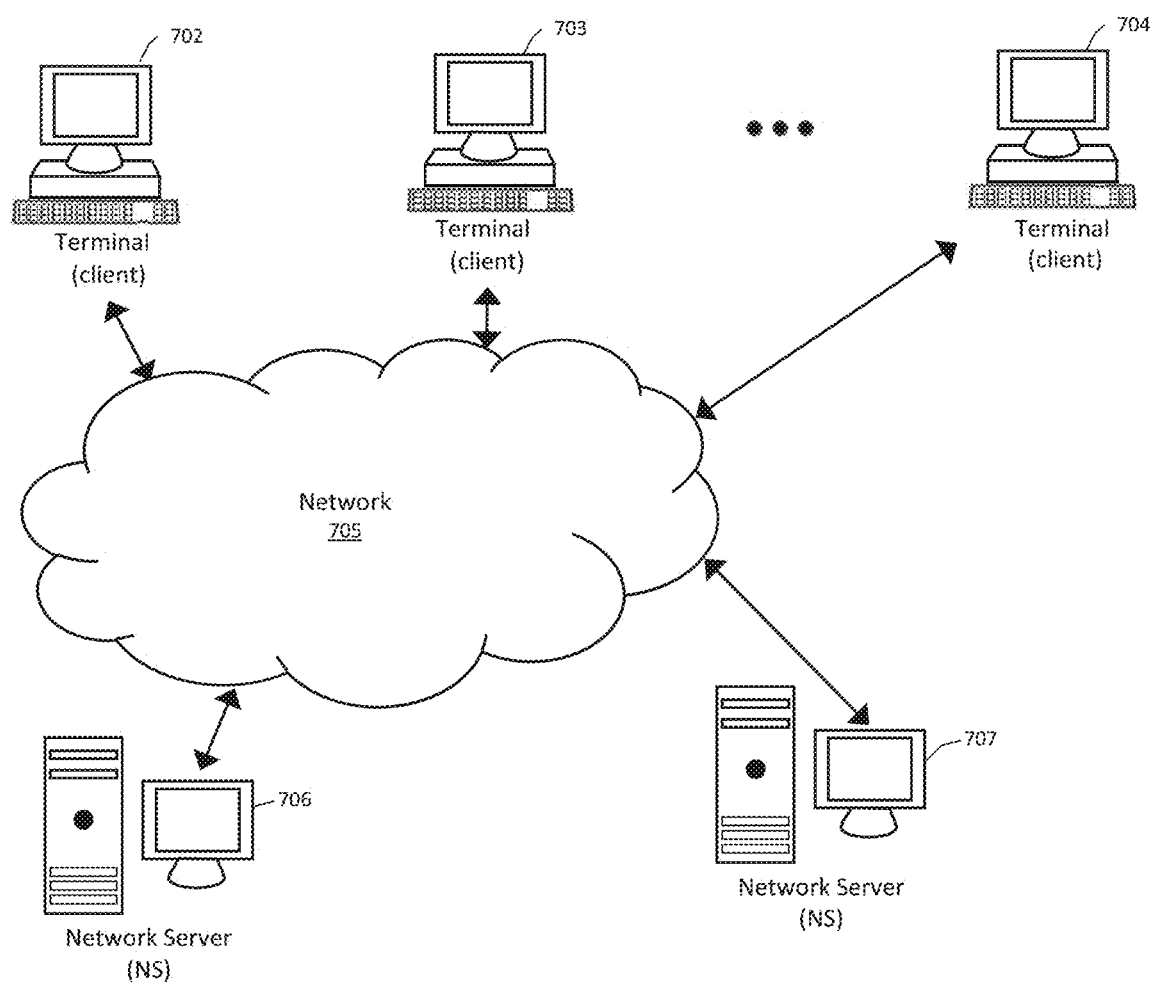
FIG. 5 is a block diagram depicting an exemplary computer-based system, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be configured to implement part of the entirety of the features and functionalities above-described for the computing device 180 of FIG. 1. In some embodiments, the servers 706 and 707 may be configured to implement part of the entirety of the features and functionalities above-described for the server 101 of FIG. 1. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content sources, etc. Any of the features of the exemplary server 706 may also be implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
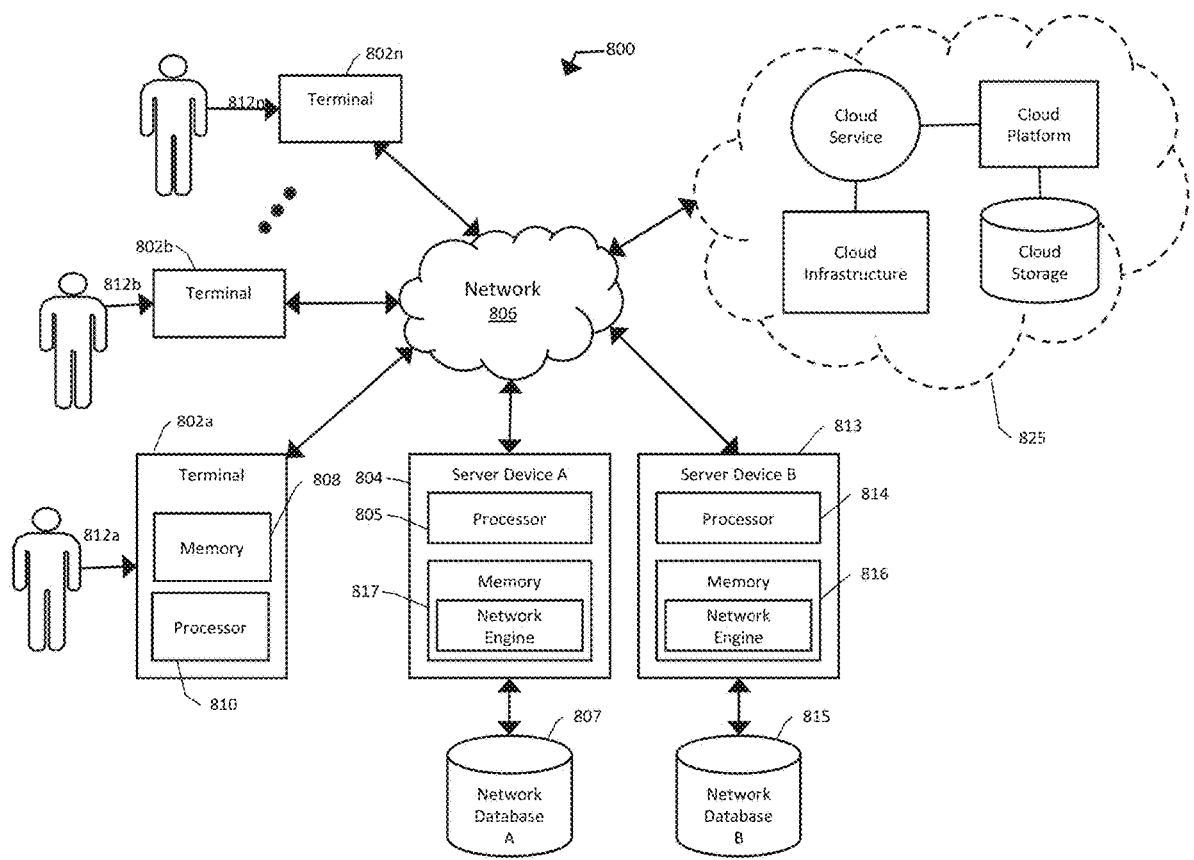
FIG. 6 is a block diagram depicting another exemplary computer-based system, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., clients) 802a, 802b through 802n shown each at least includes non-transitory computer-readable media, such as a random-access memory (RAM) 808 coupled to a processor 810 and/or memory 808. In some embodiments, the member computing devices 802a, 802b through 802n may be configured to implement part of the entirety of the features and functionalities above-described for the computing device 180 of FIG. 1. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, the server devices 804 and 813 may be configured to implement part of the entirety of the features and functionalities above-described for the server 101 of FIG. 1. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
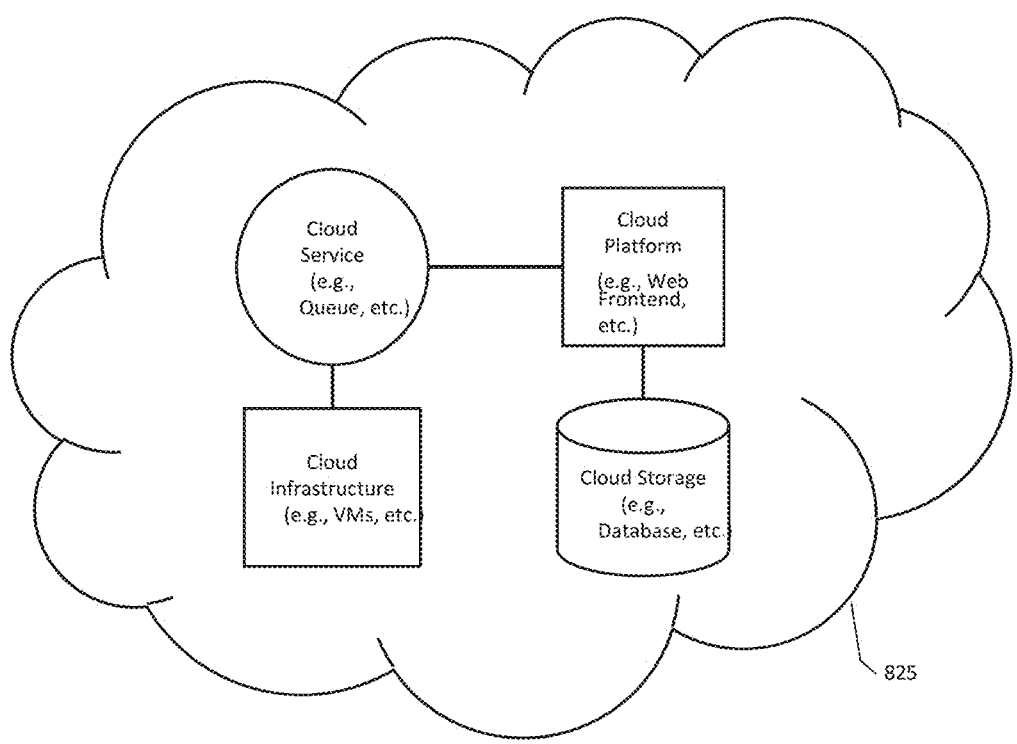
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
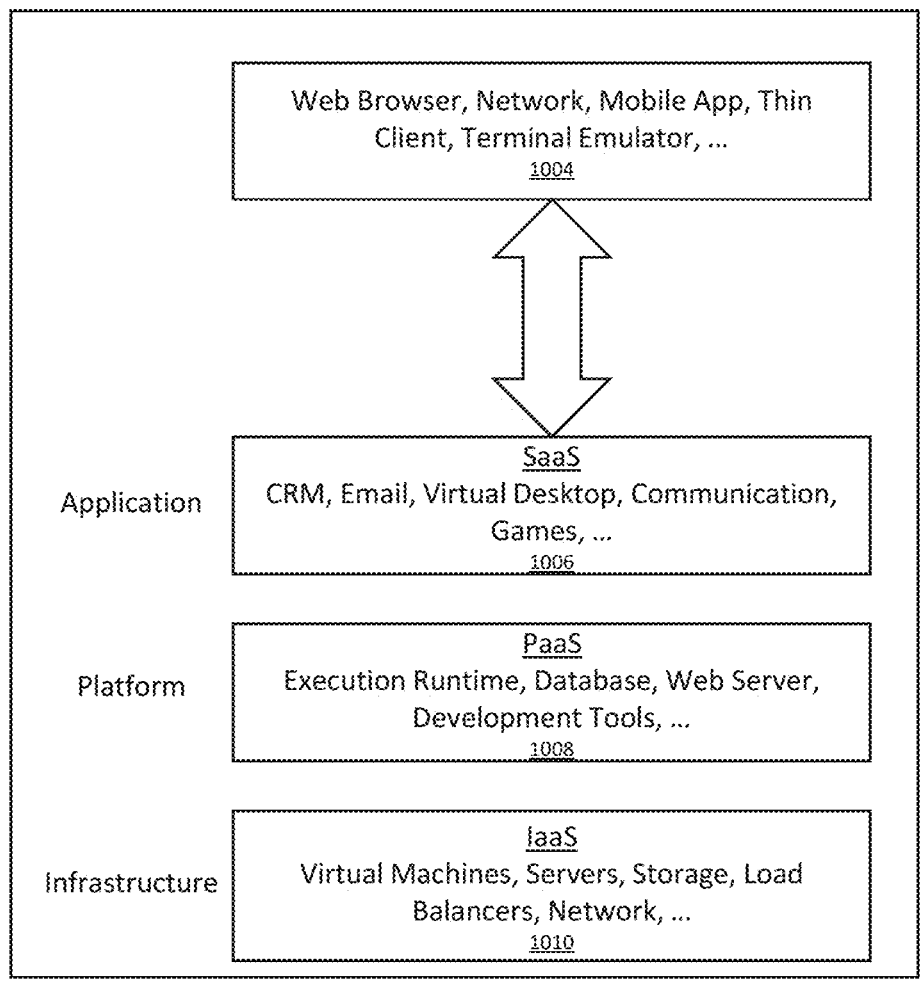

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices (e.g., the server 101, and/or the computing device 180 illustrated in FIG. 1) are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile™; 20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method including:
configuring, by one or more processors, a notification application, executing at a first computing device associated with a first user, such that to transmit an indication upon the first user initiating a call to another user, the first user associated with an entity;
receiving, by the one or more processors, from the notification application executing on the first computing device, a particular indication when the first user initiates a particular call to a second user;
receiving, by the one or more processors, from a second computing device of the second user, a permission indicator identifying a permission by the second user to detect calls being received by the second computing device;
receiving, by the one or more processors, from the second computing device, a second indication of the particular call being received from the first user;
determining, by the one or more processors, an application associated with the entity and installed on the second computing device of the second user, the application having an icon displayed at a screen of the second computing device; and
instructing, by the one or more processors, the application, executing on the second computing device, when the second computing device has received the particular call from the first user, to update an appearance of the icon associated with the application to display an indicator with regard to that the first user is associated with the entity.

Clause 2. The method of clause 1 or any clause herein, where the appearance of the icon is updated prior to the second user answers the call from the first user.

Clause 3. The method of clause 1 or any clause herein, where the indicator comprises one or more of: an outline surrounding the icon, a drop shadow on the icon, and a bubble on the icon.

Clause 4. The method of clause 1 or any clause herein, where the indicator is displayed in an on or off mode.

Clause 5. A method comprising:
obtaining, by one or more processors, a trained call verification machine learning model that determines a likelihood of when a phone number is associated with a fraudulent entity or a legitimate entity;
receiving, by the one or more processors, from a computing device of a first user, a permission indicator identifying a permission by the first user to detect calls being received by the computing device;
receiving, by the one or more processors, from the computing device, an indication of a particular call being received from a second user at a particular phone number, the second user claiming to be associated with a particular entity;
identifying, by the one or more processors, an application installed on the computing device, the application associated with the particular entity and having an icon displayed at a screen of the computing device;
utilizing, by the one or more processors, the trained call verification machine learning model to determine a likelihood that the particular phone number is associated with the particular entity; and
instructing, by the one or more processors, the computing device to update an appearance of the icon associated with the application to display an indicator to reflect the likelihood that the particular phone number is associated with the particular entity.

Clause 6. The method of clause 5 or any clause herein, further comprising:
comparing, by the one or more processors, the likelihood with a threshold to determine a binary value indicating whether the particular phone number is associated with the particular entity; and
designating, by the one or more processors, the binary value as the likelihood that the particular phone number is associated with the particular entity.

Clause 7. The method of clause 5 or any clause herein, where the likelihood comprises a range of values.

Clause 8. The method of clause 5 or any clause herein, where the indicator comprises one or more of: an outline surrounding the icon, a drop shadow on the icon, and a bubble on the icon.

Clause 9. The method of clause 8 or any clause herein, where the indicator further comprises a visual cue corresponding to the likelihood, the visual cue associated with a range of visual cues corresponding to a range of values.

Clause 10. The method of clause 9 or any clause herein, where the range of visual cues corresponds to a range of color gradients.

Clause 11. A system including:
one or more processors; and
a memory in communication with the one or more processors and storing instructions that, when executed by the one or more processors, cause the one or more processors to:
configure a notification application, executing at a first computing device associated with a first user, such that to transmit an indication upon the first user initiating a call to another user, the first user associated with an entity;
receive, from the notification application executing on the first computing device, a particular indication when the first user initiates a particular call to a second user;
receive, from a second computing device of the second user, a permission indicator identifying a permission by the second user to detect calls being received by the second computing device;
receive, from the second computing device, a second indication of the particular call being received from the first user;
determine an application associated with the entity and installed on the second computing device of the second user, the application having an icon displayed at a screen of the second computing device; and instruct the application, executing on the second computing device, when the second computing device has received the particular call from the first user, to update an appearance of the icon associated with the application to display an indicator with regard to that the first user is associated with the entity.

Clause 12. The system of clause 11 or any clause herein, where the appearance of the icon is updated prior to the second user answers the call from the first user.

Clause 13. The system of clause 11 or any clause herein, where the indicator comprises one or more of: an outline surrounding the icon, a drop shadow on the icon, and a bubble on the icon.

Clause 14. The system of clause 11 or any clause herein, where the indicator is displayed in an on or off mode.

Clause 15. A system comprising:
one or more processors; and
a memory in communication with the one or more processors and storing instructions that, when executed by the one or more processors, cause the one or more processors to:
obtain a trained call verification machine learning model that determines a likelihood of when a phone number is associated with a fraudulent entity or a legitimate entity;
receive, from a computing device of a first user, a permission indicator identifying a permission by the first user to detect calls being received by the computing device;
receive, from the computing device, an indication of a particular call being received from a second user at a particular phone number, the second user claiming to be associated with a particular entity;
identify an application installed on the computing device, the application associated with the particular entity and having an icon displayed at a screen of the computing device;
utilize the trained call verification machine learning model to determine a likelihood that the particular phone number is associated with the particular entity; and
instruct the computing device to update an appearance of the icon associated with the application to display an indicator to reflect the likelihood that the particular phone number is associated with the particular entity.

Clause 16. The system of clause 15 or any clause herein, where the instructions
further cause the one or more processors to:
compare the likelihood with a threshold to determine a binary value indicating whether the particular phone number is associated with the particular entity; and
designate the binary value as the likelihood that the particular phone number is associated with the particular entity.

Clause 17. The system of clause 15 or any clause herein, where the likelihood comprises a range of values.

Clause 18. The system of clause 15 or any clause herein, where the indicator comprises one or more of: an outline surrounding the icon, a drop shadow on the icon, and a bubble on the icon.

Clause 19. The system of clause 18 or any clause herein, where the indicator further comprises a visual cue corresponding to the likelihood, the visual cue associated with a range of visual cues corresponding to a range of values.

Clause 20. The system of clause 19 or any clause herein, where the range of visual cues corresponds to a range of color gradients.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
configuring, by one or more processors, a notification application, executing at a first computing device associated with a first user, such that to transmit an indication upon the first user initiating a call to another user, the first user associated with an entity;
receiving, by the one or more processors, from the notification application executing on the first computing device, a particular indication when the first user initiates a particular call to a second user;
receiving, by the one or more processors, from a second computing device of the second user, a permission indicator identifying a permission by the second user to detect calls being received by the second computing device;
receiving, by the one or more processors, from the second computing device, a second indication of the particular call being received from the first user;
determining, by the one or more processors, an application associated with the entity and installed on the second computing device of the second user, the application having an icon displayed at a screen of the second computing device; and
instructing, by the one or more processors, the application, executing on the second computing device, when the second computing device has received the particular call from the first user, to update an appearance of the icon associated with the application to display an indicator with regard to that the first user is associated with the entity.

2. The method of claim 1, wherein the appearance of the icon is updated prior to the second user answers the call from the first user.

3. The method of claim 1, wherein the indicator comprises one or more of: an outline surrounding the icon, a drop shadow on the icon, and a bubble on the icon.

4. The method of claim 1, wherein the indicator is displayed in an on or off mode.

5. A method comprising:
obtaining, by one or more processors, a trained call verification machine learning model that determines a likelihood of when a phone number is associated with a fraudulent entity or a legitimate entity;
receiving, by the one or more processors, from a computing device of a first user, a permission indicator identifying a permission by the first user to detect calls being received by the computing device;
receiving, by the one or more processors, from the computing device, an indication of a particular call being received from a second user at a particular phone number, the second user claiming to be associated with a particular entity;
identifying, by the one or more processors, an application installed on the computing device, the application associated with the particular entity and having an icon displayed at a screen of the computing device;

utilizing, by the one or more processors, the trained call verification machine learning model to determine a likelihood that the particular phone number is associated with the particular entity; and instructing, by the one or more processors, the computing device to update an appearance of the icon associated with the application to display an indicator to reflect the likelihood that the particular phone number is associated with the particular entity.

6. The method of claim 5, further comprising:

comparing, by the one or more processors, the likelihood with a threshold to determine a binary value indicating whether the particular phone number is associated with the particular entity; and designating, by the one or more processors, the binary value as the likelihood that the particular phone number is associated with the particular entity.

7. The method of claim 5, wherein the likelihood comprises a range of values.

8. The method of claim 5, wherein the indicator comprises one or more of: an outline surrounding the icon, a drop shadow on the icon, and a bubble on the icon.

9. The method of claim 8, wherein the indicator further comprises a visual cue corresponding to the likelihood, the visual cue associated with a range of visual cues corresponding to a range of values.

10. The method of claim 9, wherein the range of visual cues corresponds to a range of color gradients.

11. A system comprising:

one or more processors; and a memory in communication with the one or more processors and storing instructions that, when executed by the one or more processors, cause the one or more processors to:

configure a notification application, executing at a first computing device associated with a first user, such that to transmit an indication upon the first user initiating a call to another user, the first user associated with an entity;

receive, from the notification application executing on the first computing device, a particular indication when the first user initiates a particular call to a second user;

receive, from a second computing device of the second user, a permission indicator identifying a permission by the second user to detect calls being received by the second computing device;

receive, from the second computing device, a second indication of the particular call being received from the first user;

determine an application associated with the entity and installed on the second computing device of the second user, the application having an icon displayed at a screen of the second computing device; and instruct the application, executing on the second computing device, when the second computing device has received the particular call from the first user, to update an appearance of the icon associated with the application to display an indicator with regard to that the first user is associated with the entity.

12. The system of claim 11, wherein the appearance of the icon is updated prior to the second user answers the call from the first user.

13. The system of claim 11, wherein indicator comprises one or more of: an outline surrounding the icon, a drop shadow on the icon, and a bubble on the icon.

14. The system of claim 11, wherein the indicator is displayed in an on or off mode.

15. A system comprising:

one or more processors; and a memory in communication with the one or more processors and storing instructions that, when executed by the one or more processors, cause the one or more processors to:

obtain a trained call verification machine learning model that determines a likelihood of when a phone number is associated with a fraudulent entity or a legitimate entity;

receive, from a computing device of a first user, a permission indicator identifying a permission by the first user to detect calls being received by the computing device;

receive, from the computing device, an indication of a particular call being received from a second user at a particular phone number, the second user claiming to be associated with a particular entity;

identify an application installed on the computing device, the application associated with the particular entity and having an icon displayed at a screen of the computing device;

utilize the trained call verification machine learning model to determine a likelihood that the particular phone number is associated with the particular entity; and instruct the computing device to update an appearance of the icon associated with the application to display an indicator to reflect the likelihood that the particular phone number is associated with the particular entity.

16. The system of claim 15, wherein the instructions further cause the one or more processors to:

compare the likelihood with a threshold to determine a binary value indicating whether the particular phone number is associated with the particular entity; and designate the binary value as the likelihood that the particular phone number is associated with the particular entity.

17. The system of claim 15, wherein the likelihood comprises a range of values.

18. The system of claim 15, wherein the indicator comprises one or more of: an outline surrounding the icon, a drop shadow on the icon, and a bubble on the icon.

19. The system of claim 18, wherein the indicator further comprises a visual cue corresponding to the likelihood, the visual cue associated with a range of visual cues corresponding to a range of values.

20. The system of claim 19, wherein the range of visual cues corresponds to a range of color gradients.

* * * * *